(No Model.)

C. E. W. WOODWARD & C. R. OVERMAN.
VELOCIPEDE.

No. 428,991. Patented May 27, 1890.

Witnesses:
Chas. B. Shumway
Harry A. Hall

Inventors
Charles E. W. Woodward,
Charles R. Overman.
By George D. Seymour.
Atty.

UNITED STATES PATENT OFFICE.

CHARLES E. W. WOODWARD, OF CHICOPEE FALLS, AND CHARLES R. OVERMAN, OF BOSTON, ASSIGNORS TO THE OVERMAN WHEEL COMPANY, OF BOSTON, MASSACHUSETTS.

VELOCIPEDE.

SPECIFICATION forming part of Letters Patent No. 428,991, dated May 27, 1890.

Application filed April 27, 1889. Serial No. 308,796. (No model.)

*To all whom it may concern:*

Be it known that we, CHARLES E. W. WOODWARD and CHARLES R. OVERMAN, residing at Chicopee Falls and Boston, in the counties of Hampden and Suffolk and State of Massachusetts, have invented certain new and useful Improvements in Velocipedes; and we do declare the following to be a full, clear, and exact description of the same, reference being had to the accompanying drawings, which form a part of this specification.

Our invention relates to an improvement in velocipedes, the object being to produce a simple, compact, strong, and efficient driving mechanism especially adapted for tandem bicycles of the rear-driving safety type, which may by using it have their wheel-bases reduced to the minimum of length and the weight of the riders distributed so as to secure the best results.

With these ends in view our invention consists in a velocipede having certain details of construction and combinations of parts, as will be hereinafter described, and pointed out in the claim.

Figure 1:
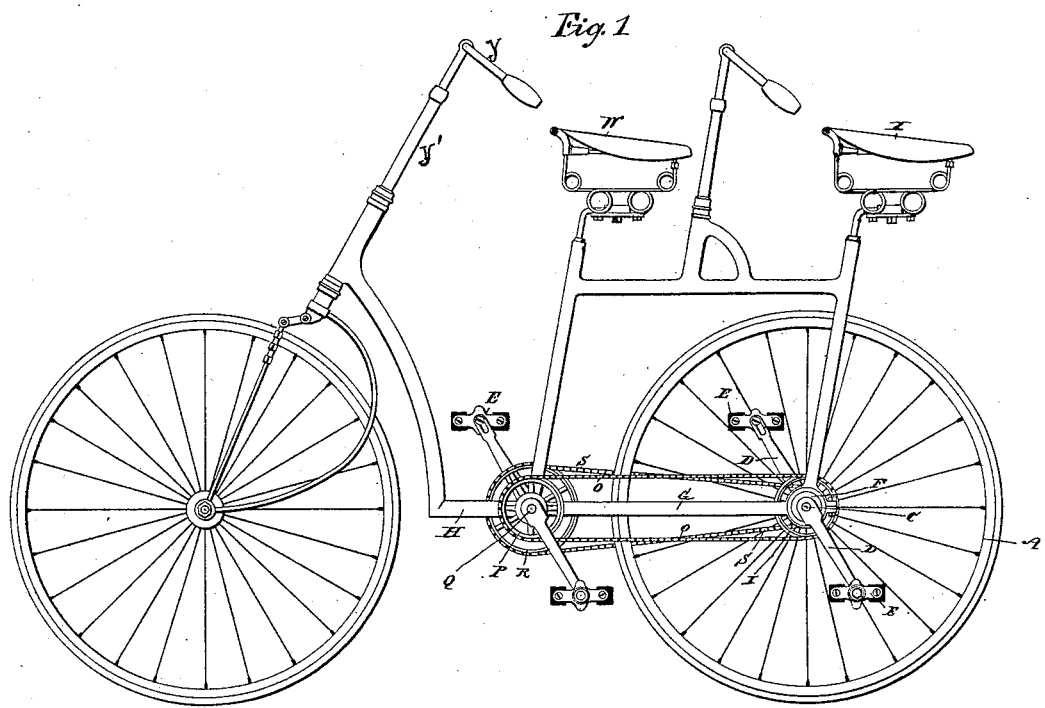
Figure 2:
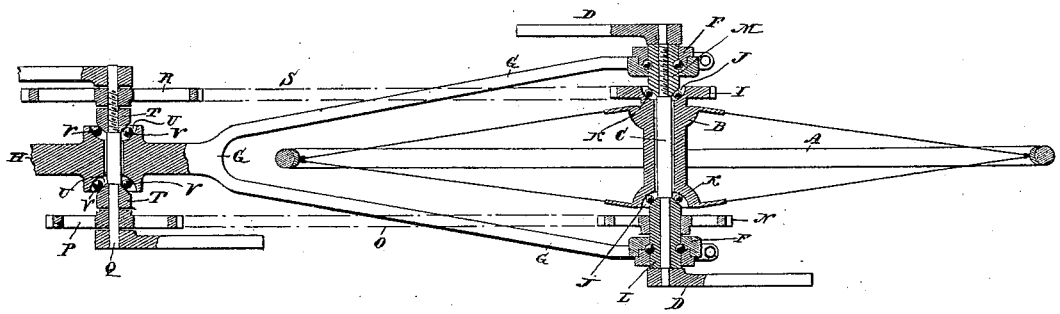

In the accompanying drawings, Figure 1 is a view in side elevation of a safety tandem bicycle embodying our invention; and Fig. 2 is an enlarged horizontal sectional view on the line *a b* of Fig. 1, and showing the driving-connections of the machine.

The rear driving-wheel A has its hub B adapted to rotate freely on its axle C, forming the rear crank-shaft of the machine and thereto provided with cranks D D, carrying pedals E E and mounted to rotate freely in ball-cases F F, respectively secured to the ends of the fork G, which is connected at its forward end with the reach H of the vehicle-frame, which at its forward end extends upward behind the front steering-wheel and forms a bearing for the steering-rod Y', to which the transverse handle-bar Y is attached. Under the described construction the said wheel and axle are each rotatable independently of the other. The said hub B, which has a small sprocket-wheel I, made integral with or secured to it, is cupped at each end, as at J J, to receive balls K, which run in raceways formed by cupping the hub, as described, and by cones L and M, the former being fixed to the shaft and the latter being adjustably mounted thereon to compensate for wear. A sprocket-wheel N, mounted on the said cone L, is connected by a chain O with a sprocket-wheel P, corresponding to it in size and rigidly secured to one end of the forward crank-shaft Q, which stands in the relation of a counter-shaft to the axle or shaft C, and is mounted in the reach H of the vehicle-frame, so as to be virtually divided in length on opposite sides thereof, whereby the strain upon its opposite ends is equalized. It will be noted, also, that the central points of the two shafts are in the same vertical plane. By making the sprocket-wheels N and P of the same size the front and rear shafts are made to revolve together. The said shaft Q is provided at its opposite end with a sprocket-wheel R, connected by a chain S with the small sprocket-wheel I, carried by the rear wheel A, the said sprocket-wheel R being made larger than the other sprocket-wheels, so as to speed up the rear wheel, which thus becomes a centrally-driven speeded wheel. The shaft Q is provided with two cones T T, co-operating with cups U U, formed on opposite sides of the reach H, to form two raceways to receive balls V, one of the cones being adjustable to take up the wear and the two bearings being sufficiently separated to hold the shaft rigidly under lateral strain.

Under the described construction the driving-wheel and its shaft revolve in the same direction, and as the driving-wheel has the greater speed it gains continually upon the shaft. Provision for this travel of the driving-wheel upon the shaft is made in the described ball-bearings, the balls whereof travel in direct relation to the difference in speed between the driving-wheel and its shaft. It will be seen that the driving-wheel thus revolves upon two sets of bearings, and that the travel or speed of each set is or may be much less than the speed of the wheel. It is believed that this distribution of wear and friction between two relatively slower-moving bearings is of advantage in a speeded wheel. The front saddle W is located nearly over the front crank-shaft, while the rear saddle X occupies a corresponding position over the rear crank-shaft.

A front transverse handle-bar Y is provided for the rider on the saddle W, and a corresponding rear handle-bar Z for the rider on the saddle X.

By locating the front crank-shaft in front of the rear wheel and utilizing the axle of the rear wheel for the rear crank-shaft we are enabled to make a vehicle with a shorter wheel-base than is possible in any machine having its rear crank-shaft in front of the rear wheel, and, in fact, to reduce the length of the wheel-base in a machine of this type to the minimum. The described location of the crank-shafts also results in distributing the weight of the riders between the two wheels, so as to cause sufficient weight to fall on the forward or steering wheel to insure steadiness of steering, whereas in machines in which the rear crank-shaft is located behind the rear wheel the same takes the weight of both riders, rendering the machine both difficult to guide and control. Our improved construction is also very strong and stiff, as there is nothing to interfere with making each shaft and its bearings as heavy as there is any call for, whereas constructions locating the cranks and gearing on studs, as has been attempted, cannot be made as strong.

The machine may be ridden by one rider, who may drive either pair of cranks, removing the other pair, if desired. In either case the speeded driving-wheel retains the advantage of having two relatively slower-moving bearings.

It is obvious that the speeding sprocket-wheels may be so arranged as to allow the weaker of the two riders to pedal faster than the other, and that in a velocipede for one rider the cranks may be attached to the axle C and the shaft Q used simply as a counter-shaft and differently located and speeded.

Although our invention is herein shown in its application to a particular type of tandem bicycle, it is obvious that it may be applied to machines driven by one rider and of different type.

We would have it understood that we do not limit ourselves to the exact construction shown and described, but hold ourselves at liberty to make such changes and alterations as fairly fall within the spirit and scope of our invention.

We are aware that it is not broadly new to provide a velocipede with a counter-shaft mounted so as to be supported between its ends at a point outside of the rim of the driving-wheel of the vehicle and having power connections with the said wheel and its crank-shaft, of which latter the wheel is independently rotatable.

We are also aware that differential power-transmitting connections between the driving-wheel, the crank-shaft, and the counter-shaft, whereby the wheel is driven faster than either of the shafts, is not new, and we do not broadly claim that construction, nor the location of the counter-shaft directly in the vehicle-frame.

Having fully described our invention, what we claim as new, and desire to secure by Letters Patent, is—

In a rear-driving front-steering tandem velocipede, the combination, with a vehicle-frame having a forward reach extending up behind the steering-wheel, of a front and a rear saddle, a steering-rod mounted in the said forward extension of the vehicle-frame and directly connected and located in line with the fork of a steering-wheel, a transverse handle-bar by which the vehicle is steered attached to the said rod, a rear transverse handle-bar located between the two saddles, a crank-shaft mounted directly in the main reach of the vehicle-frame and therein supported between its ends, adjustable ball-bearings for the ends of the said shaft, a crank-shaft also mounted in the vehicle-frame and extending axially through the driving-wheel, which is rotatable independently of it, adjustable ball-bearings for the shaft last mentioned, two sprocket-wheels corresponding in size and respectively secured to the rear crank-shaft and to the counter crank-shaft, a large sprocket-wheel also secured to the counter crank-shaft, a small sprocket-wheel secured to the driving-wheel, and chains connecting the said sprocket-wheels, whereby the driving-wheel is centrally driven and speeded to rotate faster than either of the crank-shafts, and whereby the weight of the rider is distributed so as to impose sufficient weight upon the steering-wheel to insure steadiness of steering, substantially as described.

In testimony whereof we have signed this specification in the presence of two subscribing witnesses.

CHARLES E. W. WOODWARD.
CHARLES R. OVERMAN.

Witnesses for Charles E. W. Woodward:
  CHAS. L. PEPPER,
  F. M. PARKER.
Witnesses for Charles R. Overman:
  S. G. NOTTINGHAM,
  C. S. DRURY.